United States Patent
Grandy et al.

(10) Patent No.: US 9,520,780 B2
(45) Date of Patent: Dec. 13, 2016

(54) SWITCHING MODE POWER SUPPLY WITH SPREAD SPECTRUM OSCILLATOR

(71) Applicant: TRW Automotive U.S. LLC, Livonia, MI (US)

(72) Inventors: Mark Emerson Grandy, Livonia, MI (US); Jonathan Joseph Kuhn, Livonia, MI (US); Christopher Nelson St. John, Northville, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 333 days.

(21) Appl. No.: 14/181,956

(22) Filed: Feb. 17, 2014

(65) Prior Publication Data
US 2015/0232029 A1    Aug. 20, 2015

(51) Int. Cl.
*H02M 3/157*    (2006.01)
*H02M 1/44*    (2007.01)

(52) U.S. Cl.
CPC .............. *H02M 3/157* (2013.01); *H02M 1/44* (2013.01)

(58) Field of Classification Search
CPC ........... H02M 1/44; H02M 3/157; B60R 1/00; B60R 2300/40; H04N 7/183
See application file for complete search history.

(56) References Cited

U.S. PATENT DOCUMENTS

| | | | | |
|---|---|---|---|---|
| 7,342,528 B2* | 3/2008 | Ng | .......................... | H02M 3/157 341/153 |
| 7,417,509 B2* | 8/2008 | Kultgen | .................. | H04B 15/04 331/16 |
| 7,423,494 B1* | 9/2008 | Xin-LeBlanc | ........... | H03K 3/84 331/78 |
| 2011/0012575 A1* | 1/2011 | Midya | ..................... | H02M 1/44 323/282 |

* cited by examiner

*Primary Examiner* — Matthew Nguyen
(74) *Attorney, Agent, or Firm* — Tarolli, Sundheim, Covell & Tummino LLP

(57) ABSTRACT

Apparatus for use in a system, including a microcontroller for controlling the system, where the microcontroller includes at least one internal module capable of generating a periodic pulse signal. The microcontroller is programmed and operated so that the internal module generates a periodic pulse signal that is a pseudo-random spread spectrum oscillator signal. A switching mode power supply is responsive to the pseudo-random spread spectrum oscillator signal. The switching mode power supply comprises a solid state switch and a modulator for driving the solid state switch with a drive signal related to the periodic pulse signal generated by the internal module of the microcontroller.

19 Claims, 4 Drawing Sheets

SWITCHING MODE POWER SUPPLY WITH SPREAD SPECTRUM OSCILLATOR

FIELD OF THE INVENTION

The present invention is directed to high frequency noise reduction in switching mode power supplies through use of a spread spectrum oscillator.

BACKGROUND

Motor vehicles today are equipped with sophisticated electronic systems. The 12V batteries typically found in motor vehicles provide a ready source of electrical energy for such systems, but the battery voltage is generally too high and also quite unstable. Buck-type switching mode power supplies ("SMPS") are therefore sometimes used to convert the vehicle battery voltage to the lower, more stable voltage needed to power a particular system or subsystem. SMPS receive the unregulated battery voltage and convert it into stable direct current power at a lower voltage of, e.g., 5V or 3.3V. This type of SMPS is referred to as a 'buck' type SMPS because the supply voltage at the output of the SMPS is lower than the source voltage at the input to the SMPS.

Some electronic systems used within motor vehicles are sensitive to high frequency RF noise such as radio frequency interference ("RFI") and electromagnetic interference ("EMI"). It is therefore desirable that all systems used within the motor vehicle, including any power supplies, be carefully designed to contribute as little high frequency RF noise as possible.

SUMMARY OF THE INVENTION

The present invention provides a switching mode power supply that generates reduced levels of high frequency noise through use of a spread spectrum oscillator ("SSO"). The SSO is realized through use of the existing system microcontroller without additional integrated circuit components.

In accordance with one example embodiment of the present invention, apparatus is provided for use in a system, where the apparatus includes a microcontroller for controlling the system. The microcontroller has at least one internal module capable of generating a periodic pulse signal. The microcontroller is programmed and operated so that the internal module generates a periodic pulse signal that is a pseudo-random spread spectrum oscillator signal. A switching mode power supply is responsive to the periodic pulse signal. The switching mode power supply comprises a solid state switch and a modulator for driving the solid state switch with a drive signal related to the periodic pulse signal generated by the internal module of the microcontroller.

In accordance with an example embodiment of the present invention, the microcontroller for controlling the system includes a central processing unit, a memory for storing digital values, a digital oscillator having a register and responsive to the register for generating a periodic pulse signal having a frequency related to the digital value contained in the register, a first module operable to load values from the memory into the register, and a timer for triggering the first module at regular intervals to load a new value from the memory into the register, the values being selected so that the periodic pulse signal generated by the digital oscillator varies in a pseudo-random manner. The modulator of the switching mode power supply is responsive to the periodic pulse signal.

In accordance with one example embodiment of the present invention, a vision system is provided for a motor vehicle. The vision system includes an imaging sensor that is adapted for mounting on a motor vehicle so as to view a scene relative to the motor vehicle. The imaging sensor generates pixel data regarding the image. The system further includes at least one processor for processing the pixel data generated from the imaging sensor and controlling the system. The processor includes at least one internal module capable of generating a periodic pulse signal. The processor is programmed and operated so that the internal module generates a periodic pulse signal that is a pseudo-random spread spectrum oscillator signal. The system includes a low noise switching mode power supply. The switching mode power supply comprises a solid state switch, a modulator for driving the solid state switch in accordance with the periodic pulse drive signal generated by the at least one internal module, and an output filter at the output of the solid state switch for generating power for at least a portion of the system.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
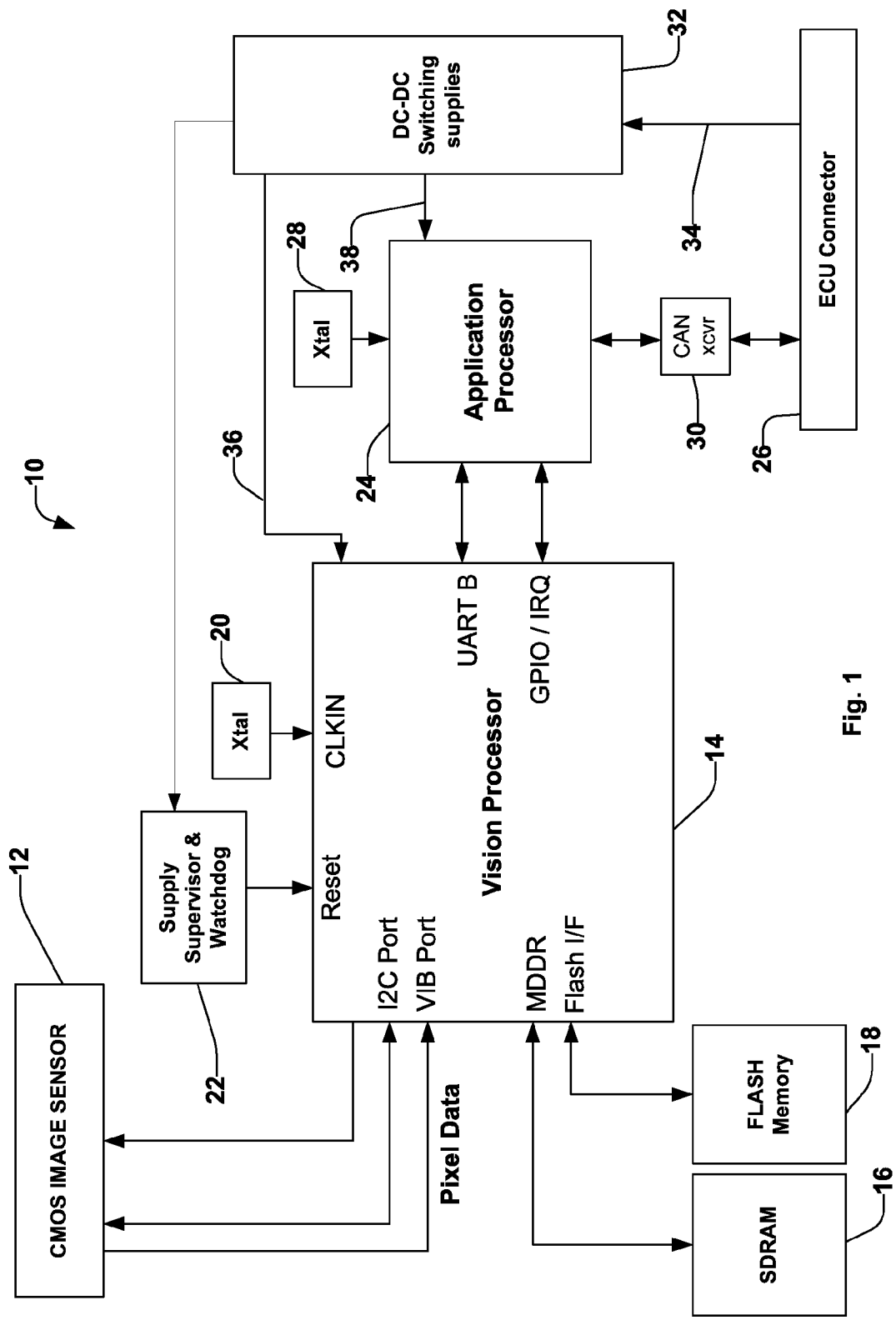
FIG. 1 is a block diagram of a system in which the present invention may beneficially find use, comprising a forward-looking vision system for a motor vehicle.

Referring to FIG. 1, a block diagram is shown of a system in which the present invention may be used. In FIG. 1, the system takes the form of a forward-looking vision system for a motor vehicle. The system 10 is housed in a small enclosure (not shown) that is, in turn, mounted in the top center of the vehicle windscreen. A CMOS image sensor 12 is included in the system and is mounted and positioned within the enclosure so that it views the road ahead through a window in the enclosure and through the windscreen. A special-purpose vision processor 14 processes the pixel data supplied by image sensor 12. Vision processor 14 may have off-chip support circuits, including for example memory components 16 and 18, a clock circuit 20, and a supply supervisor and watchdog circuit 22.

Vision processor 14 analyzes the pixel data from the image sensor to derive image information characterizing features detected in the image of the road ahead, such as highway lane markers, fixed and moving obstacles (e.g. vehicles, pedestrians, and hazardous road debris), road signs, and the like. The vision processor uses the image information in algorithms that perform such control functions as, for example, lane keeping, cruise control and station-keeping, obstacle avoidance, etc. Image processing is a complex and time consuming task requiring significant processor power, and for this reason vision processor 14 is dedicated primarily to the performance of the image processing task.

A secondary or 'application' processor 24 manages the system 10 and provides an interface, via a connector 26, between vision processor 14 and other vehicle systems. In the embodiment presently being described, application processor 24 is an MPC5604E (a.k.a. "Pictus") microcontroller commercially available from Freescale Semiconductor. Application processor 24 includes not only a central processing unit, program memory (ROM) and random access memory (RAM), but also a rich set of built-in peripheral modules. Among the included peripheral modules are an enhanced DMA ("eDMA") controller and a frequency modulated phase locked loop ("FMPLL"), both of which will be discussed in more detail below. Application processor 24 may have off-chip support circuits as well, such as a clock circuit 28 and a separate CAN transceiver 30.

The circuits that together make up the system 10 require stable electrical power at designated supply voltages and load currents. A set of switching mode power supplies 32 ("SMPSs") receive power from the vehicle battery via power lines 34 routed through connector 26. The SMPSs convert the 12V battery voltage to stable, lower voltages that are used to power vision processor 14, application processor 24, and other system components. For example, SMPS set 32 may include three SMPSs providing supply voltages of 5V, 3.3V, and 1.8V at associated load current capabilities. Power connections from SMPS set 32 to processors 14 and 24 are shown at 36 and 38 respectively. Power connections also exist to other system components, but those connections have been omitted from the drawing for simplicity of illustration.

Figure 2:
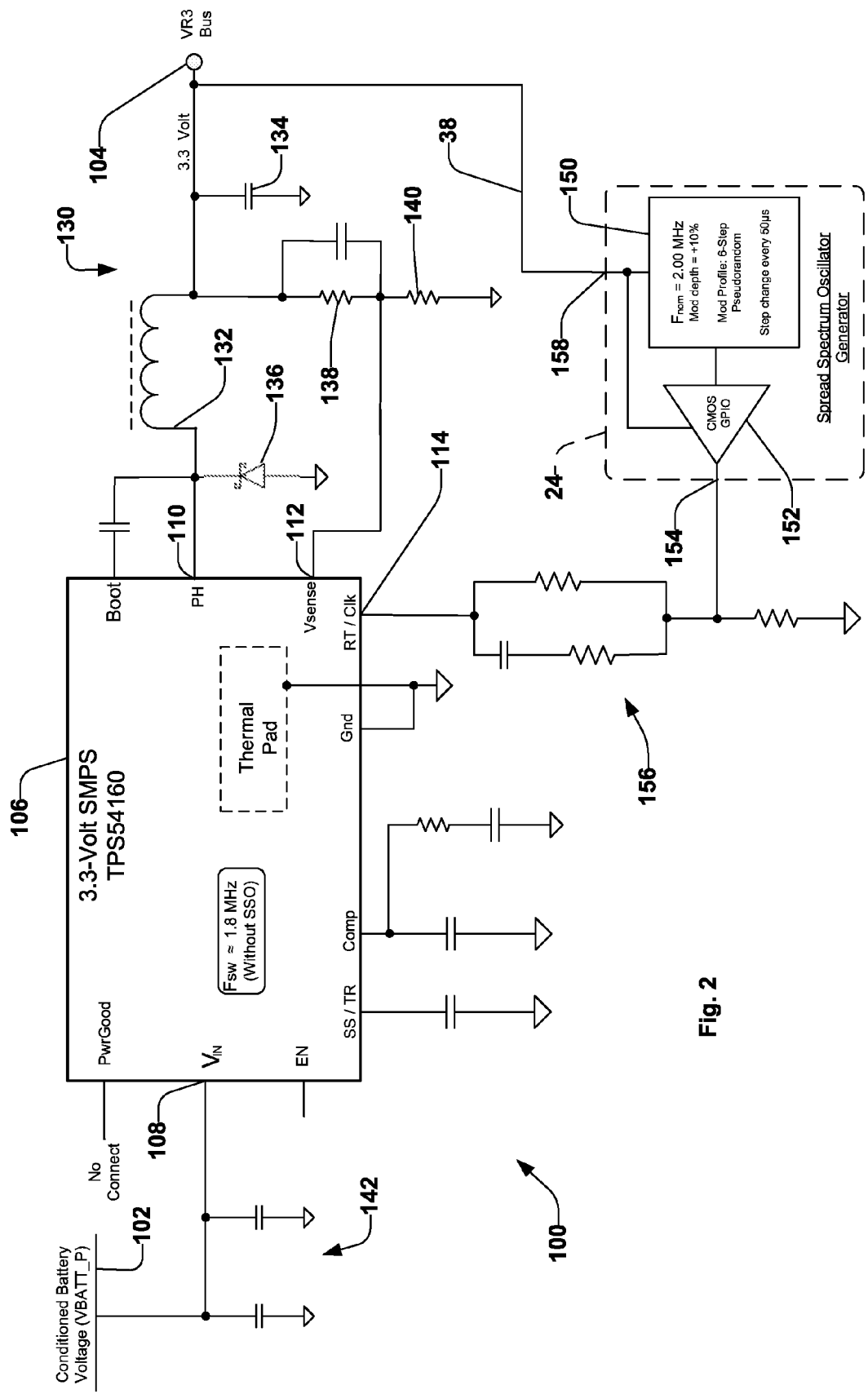
FIG. 2 is a circuit schematic of an SMPS incorporating an example embodiment of the present invention.

The individual SMPSs included in SMPS set 32 may be implemented using readily available integrated circuits ("ICs"). Texas Instruments offers an SMPS integrated circuit identified as the TPS54160 that may be used in motor vehicle applications such as the forward-looking vision system presently being described. FIG. 2 is a circuit schematic of an implementation of an SMPS using the TPS54160 IC. Referring to FIG. 2, SMPS 100 has an input 102 that is connected to the positive terminal of a conventional 12V vehicle battery via power lines 34 of FIG. 1. A supply output 104 provides the power supply signal from the SMPS to downstream systems including processors 14 and 24, in this case 3.3V. The battery, SMPS, and downstream systems are all also connected to a common ground, of course, which usually is the vehicle chassis.

The heart of SMPS 100 of FIG. 2 is the Texas Instruments TPS54160 integrated circuit 106. The content and operation of IC 106 are known per se and will not be described herein, except in a summary manner. IC 106 has multiple pins for electrical connection of internal components with external components. For present purposes, the relevant connection pins are the voltage supply input pin 108, the pulse modulated output pin 110, the voltage sense pin 112, and the external clock pin 114. The function of IC 16 with relation to these three pins may be understood through reference to the simplified block diagram of FIG. 3.

Figure 3:
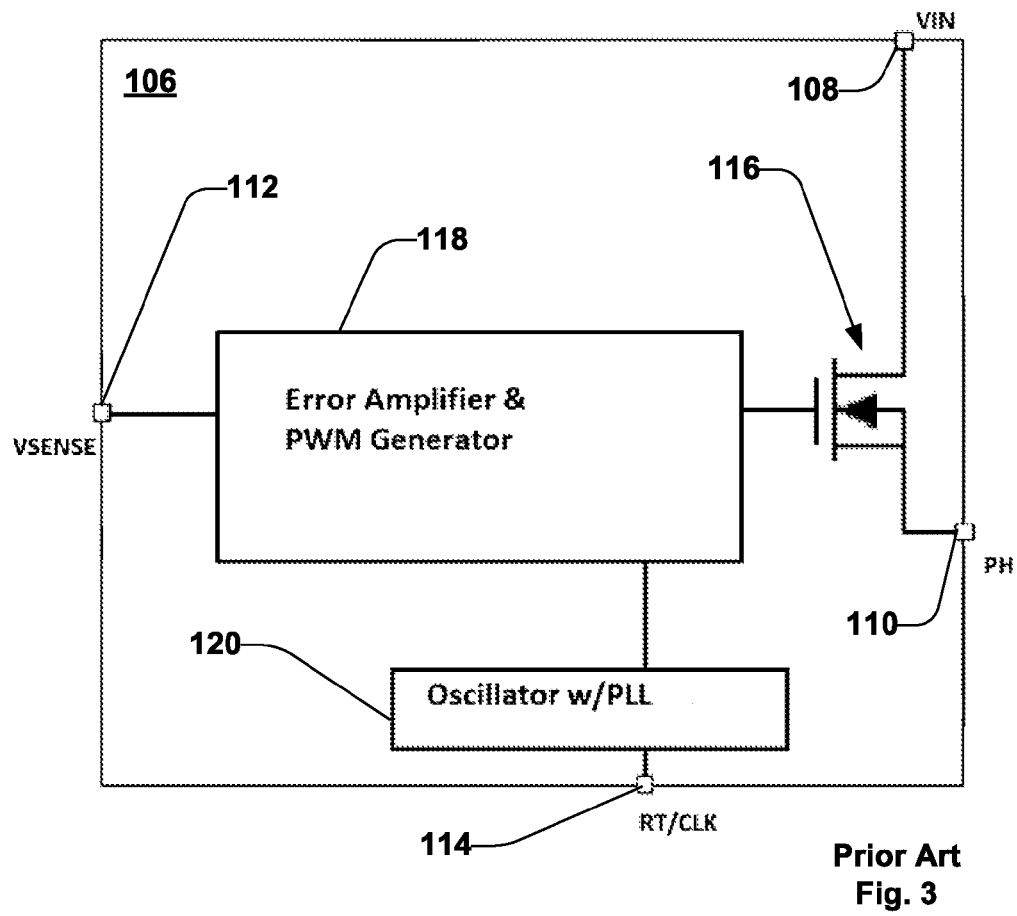
FIG. 3 is a functional block diagram of the known SMPS integrated circuit used in the circuit of FIG. 2.

As shown in FIG. 3, IC 106 provides a direct path between the input pin 108 and output pin 110. The path is interrupted only by the source-drain signal path of a MOSFET power switch 116, which is interposed along this path between the input and output pins. MOSFET power switch 116 is turned on and off by a pulse-width modulated ("PWM") drive signal. The PWM drive signal is supplied to the gate terminal of MOSFET 116 by a modulation circuit 118, which functions as an error amplifier and pulse width modulator. Modulation circuit 118 responds to a clock signal provided by oscillator 120 and a feedback signal appearing on sense pin 112 to generate the PWM drive signal for application to the gate of MOSFET 116. The PWM signal comprises a train of periodic pulses, where the frequency of the pulses matches the frequency of the signal supplied by oscillator 120 and the width of the pulses is modulated as an inverse function of an error signal generated by an error comparator embedded in modulator 118. The error comparator compares the actual magnitude of the feedback signal on pin 112 with the desired magnitude of the output voltage, as represented by a reference voltage (not shown). If the amplitude of the feedback signal applied to sense pin 112 is too high, modulator 118 will decrease the pulse width of the PWM signal. If the amplitude of the feedback signal is too low, modulator 118 will increase the pulse width of the PWM signal.

The TPS54160 IC used in SMPS 100 is designed so that the clock signal provided by oscillator 120 may be overridden by an externally generated clock signal applied to external clock pin 114. As will be described in more detail hereinafter, this feature is exploited in the described embodiment of the present invention to use spread spectrum techniques to reduce high frequency noise.

Referring back to FIG. 2, SMPS 100 includes an output filter 130 for converting the PWM signal at output pin 110—where the PWM signal is a pulse signal switching between battery voltage and ground—into a stable DC output voltage. Output filter 130 includes series inductor 132 and a parallel capacitor 134, with the capacitor on the downstream side of inductor 132. A so-called "catch diode" 136 is included on the upstream side of inductor 132 to free-wheel current through inductor 132 and also prevent the voltage at pulse modulated output pin 20 from going significantly below ground. Catch diode 136, which is usually a Schottky diode, has its cathode connected to the junction between pulse modulated output pin 110 and inductor 132, and its anode connected to ground.

As previously described with respect to FIG. 3, IC 106 has an asynchronous SMPS topology. That is, IC 106 has a single, high-side MOSFET switch rather than two, high-side and low-side MOSFET switches connected in a push-pull configuration. As such, IC 106 has no low-side MOSFET to free-wheel current when MOSFET 116 is turned 'off.' Instead, catch diode 136 is included to provide a free-wheeling current path and thereby protect pulse output pin 110 from negative voltage spikes. Without catch diode 136, charging current to capacitor 134 would be cut off and the voltage at pulse output pin 110 would be pulled significantly below ground each time MOSFET 116 (FIG. 3) switched 'off.' Catch diode 136 will normally be reverse-biased when MOSFET 116 is 'on' but, each time MOSFET 116 turns 'off', inductor 132 will continue to pull current through catch diode 136 as the magnetic field in the inductor collapses. Thus, at the end of each power pulse from IC 106, catch diode 136 will become forward-biased while the current through inductor 132 decays back towards zero. The current decay is rather slow compared to the frequency of the PWM signal, hence catch diode 136 will still be forward-biased and conducting when MOSFET 24 next turns 'on.'

The voltage appearing across capacitor 134 is a filtered signal having a DC amplitude equal to the mean level of the PWM signal generated by IC 106; this signal represents the output signal of SMPS 100. It is this voltage that is applied to supply output 104. To achieve closed-loop regulation of this supply output voltage, a portion of the voltage is fed back to sense pin 112 of IC 106 via a voltage divider including resisters 138 and 140. In the manner previously described with respect to FIG. 3, IC 106 will regulate the width of the pulses in the PWM signal at pulse output pin 110, and thus the mean amplitude of the PWM signal, so as to adjust the DC amplitude of the filtered signal recovered by filter 130 and appearing on supply output 14. The voltage at supply output 104 of SMPS 100 is therefore regulated at the desired output voltage, which is 3.3V in the embodiment of FIG. 2.

Filtering is typically also provided at the input pin 108 of IC 106 to condition the supply voltage signal from the vehicle battery. Such filtering in FIG. 2 is provided by an input circuit 142 comprising two capacitors, each connected in parallel across input pin 108, where the capacitors have capacitance and internal resistance characteristics selected to provide the desired filtering.

Switching power supplies, such as a buck SMPS regulator, can produce an unacceptable amount of electrical noise (EMI/RFI) due to the rapid switching that is inherent in their operation. A known technique to reduce the peak levels of EMI/RFI noise arising from SMPS operation is to clock the PWM switching with a clock generator, referred to as a 'spread spectrum oscillator' ("SSO"), that produces a clock signal having a varying frequency. The varying frequency acts to spread-out the harmonic energy that makes up the EMI/RFI so the average energy at any particular monitored EMI/RFI frequency is reduced.

Usually, a SSO varies or 'dithers' its frequency at a fixed rate of variation or, stated differently, at a fixed modulation frequency. The changing oscillator frequency usually follows a modulation pattern of either a triangular or sinusoidal modulating signal at a fixed modulation frequency. An even more effective frequency variation scheme for the SSO is to have its frequency variation follow a random or at least pseudorandom pattern. This pseudo-random spread spectrum ("PRSSO") modulation scheme reduces the chance that any residual noise from the varying frequency of the SSO will be unlikely to create unsatisfactory interference with other system operations or be perceptible to a vehicle occupant as audible noise in an audio system or as visual noise on a video display.

While the use of a SSO or PRSSO to clock a SMPS regulator is known per se, the source of the SSO clock has in the past either been a dedicated external SSO device or (for higher power regulators) an internal SSO functional block within the regulator IC. Where only low power is required, higher power regulators are unnecessarily large and costly. Unfortunately, for low power buck regulators, the option of an internal SSO for clocking is not offered by the industry. Thus, for low powered buck type SMPS regulators, an external SSO IC such as the LINEAR LTC6908-1 must be employed. This option has the downside of requiring additional board space and cost.

The inventor has discovered that the reduced noise benefits of spread spectrum techniques may be realized in certain systems without the need for a separate, dedicated SSO. Specifically, in the example embodiment presently being described, the pseudo-random SSO signal may be generated by novel use of the FMPLL module that is embedded in the Freescale MPC5604E microcontroller that is used as application processor 24 of FIG. 1.

This use of the FMPLL within application processor 24 is represented in FIG. 2, where the FMPLL module of the processor is indicated in function form at 150 but, for clarity of illustration, other functional blocks of the processor are omitted. As will be described below, the FMPLL is configured and operated so that it provides an PRSSO clock signal suitable for use in clocking SMPS IC 106. The output of the FMPLL is applied to a general purpose input/output circuit 152, and then to an output pin 154 of processor 24. The output pin 154 of processor 24 is coupled to external clock input pin 114 of SMPS IC 106 via a signal conditioning circuit 156 comprised of a small network of three resistors and a capacitor. The design operation of SMPS IC 106 is such that the resistance of circuit 156 also establishes the free-running frequency of the internal oscillator 120 (FIG. 3) in the absence of an external clock input.

In FIG. 2, it will be noted that the power supply input pin 158 of processor 24 is coupled to the supply output 104 of SMPS 100, whereby processor 24 is in fact powered by SMPS 100. This point will be discussed further, below.

Figure 4:
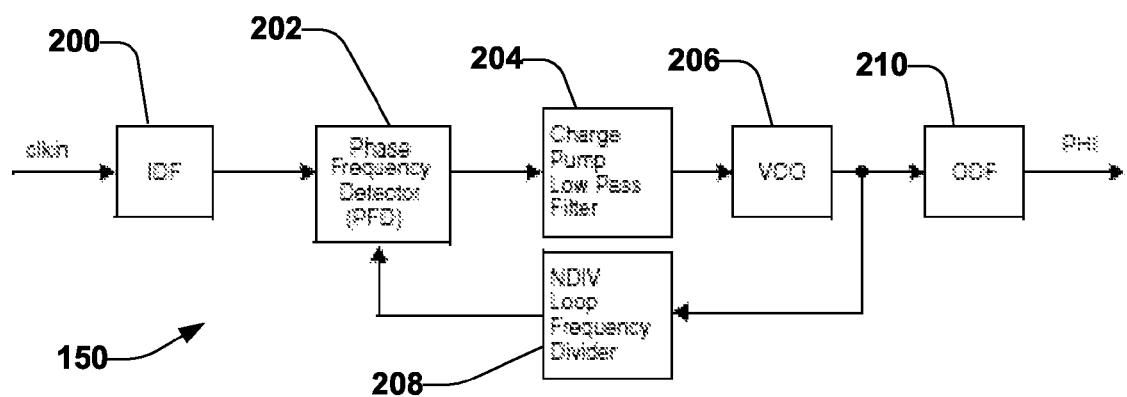
FIG. 4 is a block diagram of the frequency modulated phase locked loop ("FMPLL") portion of the application processor, commercially available and known per se, used in the system of the figures; and, FIG. 5 is a process flow chart illustrating the process used by the application processor to generate the software generated pseudo-random spread spectrum clock signal in accordance with one embodiment of the present invention.

The general functioning of FMPLL 150 of processor 24 is well described in Chapter 4.6 of the publicly available MPC5604E Microcontroller Reference Manual, the content of which is hereby incorporated by reference in its entirety. A block diagram of the FMPLL, similar to one included as FIG. 13 from that Reference Manual, is shown in FIG. 4 hereof. As represented in FIG. 4, the central elements of FMPLL 150 are a voltage controlled oscillator ("VCO") 206 and a phase/frequency detector ("PFD") 202. PFD 202 compares the phase and frequency of the VCO output, as divided down by a loop divider ("NDIV") 208, with a clock signal ("clkin") from a fixed clock source (not shown) within processor 24, as divided down by an input division factor ("IDF") 200. The output of PFD 202 is a train of pulses having widths that change in accordance with frequency and phase error. The output of PFD 202 is low-pass filtered by charge pump/filter 204 to provide a control voltage that is applied to the frequency control input of VCO 206. The output of VCO 206, as divided down yet again, this time by output division factor 210, is the output of FMPLL 150.

The frequency of the clock signal provided by FMPLL 150 is established by the numerical values loaded into several internal control registers for the PLL, including values controlling the IDF 200, ODF 210, and NDIV 208. The values for all the controlling registers for the PLL except the NDIV register are set to fixed values by the operating software during the power-on initialization routine of processor 24. The value of the NDIV register, which controls division of the feedback loop of the PLL oscillator, is updated periodically to achieve frequency modulation of a nominal frequency of 2.0 MHz.

More specifically, a group of six different NDIV register values (8-bit) for generating eight frequencies between 2.0 MHz and 2.2 MHz are arranged in a disordered, random sequence in a 30-entry table in read-only memory ("ROM") of processor 24. Since there are 30 entries in the table and only six unique NDIV register values, each one of the six values will be stored in multiple locations in the table, with each NDIV register value on average being stored between 3 and 4 times. Every 50 µs, processor 24 loads the next sequential value from the ROM table into the NDIV register associated with loop divider 208. Thus, every 50 µs the frequency provided by FMPLL 150 changes randomly between the six different frequencies represented by the six NDIV values that are dispersed across the ROM table.

Figure 5:
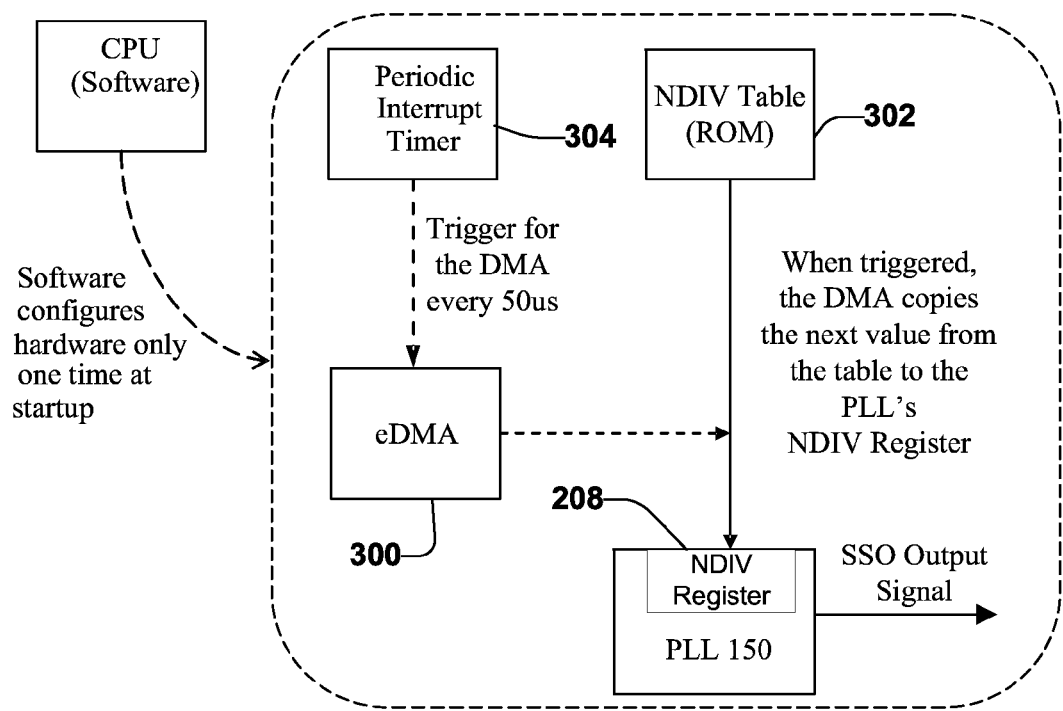

The eDMA, or enhanced DMA, function of the MPC5604E microcontroller is used to service the FMPLL function by loading new NDIV values periodically, as described above. The eDMA function is operable to periodically load individual values from a specified source location to a specified destination location. Since the eDMA function operates virtually autonomously of the processor, the use of the eDMA function beneficially eliminates consumption of processor time to manage the FMPLL function. As illustrated schematically in the process flow chart of FIG. 5, the eDMA function 300 is configured to copy consecutive values from the NDIV ROM table 302 into the PLL's NDIV register 208 to effect FM modulation of the frequency that is being generated by the PLL module 150. Each time a value is loaded, the eDMA source address register is incremented. When the end of the table is reached, the source address register is reset so that copying continues from the beginning of the table.

Each eDMA transfer is triggered by an interrupt signal from the autonomous periodic interrupt timer module 304 of processor 24. Timer module 304 is programmed to issue an interrupt to eDMA 300 every 50 µs, triggering eDMA 300 to transfer a new NDIV value from the ROM table to the NDIV register. This configuration effectively creates a pseudorandom step or 'hop' in the output frequency of the PLL at a rate of 20 kHz for the six different frequency steps. Thus, a pseudo-random spread spectrum oscillator, or PRSSO, clock signal is generated for SMPS IC 106 without the use of a separate PRSSO IC and without adding burden to existing processor functions. Processor 24 is only required to configure the operation of the FMPLL, Periodic Interrupt Timer, and eDMA functions one time, at startup of the system.

As pointed out previously, processor 24 is powered from the same SMPS (SMPS 100) to which processor 24 supplies the PRSSO signal. As such, when battery power is initially applied at power-up of the forward-looking vision system 10, the PRSSO signal is not immediately available for clocking the SMPS regulator.

Fortunately, the TPS54160 integrated circuit used as IC 106 (FIG. 3) is designed so that, when no active oscillator signal present at the external clock pin 114 of the IC, the IC reverts to using the internal silicon R/C oscillator 120 within the regulator. Upon initial power up, internal oscillator 120 provides a switching clock to modulator 118, and thus the regulator is able to function to provide 3.3V power to processor 24 and other system components. The resistance between external clock input 114 and ground will determine the resulting free-running oscillation frequency. Once the 3.3V bus is powered and processor 24 becomes active, the PRSSO signal function of processor 24 is initiated and becomes available to the external clock pin 114 of IC 106, whereupon that external spread spectrum clock frequency thereafter controls the PWM frequency.

In summary, when battery power is first applied to the forward-looking vision system 10, the SMPS regulator is clocked by its internal oscillator and the frequency of this oscillator is set by the resistance seen at the external clock input of the IC. This resistance is set so that the nominal switching frequency of the regulator, in the absence of an external clock signal, is about 1.8 MHz. Once the 3.3V bus powers up, processor 24 becomes active and begins generating the PRSSO signal. When the PRSSO signal is present at external clock pin 114, regulator IC 106 automatically switches over to using that signal to clock its internal operation and output switching. Since the PRSSO signal is spread-spectrum in nature, any EMI/RFI noise generated by the operation of the regulator is distributed over a range of frequencies rather than remaining concentrated at a specific frequency. On a time-average basis, then, the peak levels of the harmonic EMI/RFI are reduced.

As a refinement, if transient effects are experienced at startup of the system, it may be useful to delay presenting the PRSSO signal to the GPIO port of the processor. In the example embodiment presently being described, processor 24 is programmed to delay the presentation of the PRSSO to the GPIO pin until about 300 ms after battery power is first applied to the module 10.

For specific customer requirements, it may be desirable to operate the regulator without spread-spectrum clocking. For such applications, the PRSSO can be disabled via software and the switching frequency will automatically be established and maintained instead by the internal R/C oscillator of the TPS54160 regulator, even though the electrical connection between the regulator and processor 24 is maintained as depicted in FIG. 2.

This approach to providing a SSO-type clocking signal for the switching regulator and other circuits is therefore intrinsically optional (enabled or disabled by software within the processor), and requires no additional semiconductor components such as ICs, no additional board space, no additional power consumption, and no additional cost. The programming strategy, further, adds minimal processing overhead to the intended primary functionality of the microprocessor.

In the figures and embodiments described, the core of the switching mode power supply is an integrated circuit. Those skilled in the art will recognize that the same inventive concept can as readily be implemented in a switching mode power supply fashioned from discrete components.

While the initial intent for the software generated SSO signal is to clock a switching regulator in order to reduce the peak harmonic EMI/RFI energy, the same PRSSO signal source could be used as a clocking source for other circuits within the module to reduce the EMI/RFI harmonic energy associated with their circuit operation as well. For example, the PRSSO signal could be used as a clock source for an image sensor or other microprocessor operation within the same module.

In the foregoing description, the function and connection of an example embodiment have been described. However, not all signal lines and circuit components have been exhaustively described because such lines and components are peripheral to the invention and/or because one skilled in the art will readily understand such matters without specific instruction, particularly when informed by the many supporting technical documents that are publicly available for the identified components.

From the above description of the invention, those skilled in the art will perceive improvements, changes and modifications. Such improvements, changes and modifications within the skill of the art are intended to be covered by the appended claims.

Having described the invention, the following is claimed:
1. Apparatus for use in a system, comprising;
   a microcontroller for controlling the system, said microcontroller including at least one internal module capable of generating a periodic pulse signal, said microcontroller being programmed and operated so that said at least one internal module generates a periodic pulse signal that varies at a regular interval and is a pseudo-random spread spectrum oscillator signal selected from a plurality of predetermined frequencies; and,
   a switching mode power supply responsive to said periodic pulse signal, said switching mode power supply comprising a solid state switch and a modulator for driving said solid state switch with a drive signal related to said periodic pulse signal generated by said internal module of said microcontroller.

2. Apparatus as set forth in claim 1, wherein said microcontroller includes a central processing unit and said internal module comprises a digital oscillator that is controllable by said central processing unit, said digital oscillator providing said periodic pulse signal.

3. Apparatus as set forth in claim 2, wherein said internal module further includes a register for storing a digital value and said digital oscillator controls the plurality of predetermined frequencies of said periodic pulse signal in accordance with said digital value.

4. Apparatus as set forth in claim 3, wherein said microcontroller causes said register to switch between multiple digital values in a pseudo-random manner whereby a frequency of the plurality of predetermined frequencies of said periodic pulse signal changes to the selected plurality of predetermined frequencies in a pseudo-random manner.

5. Apparatus as set forth in claim 4, wherein said multiple digital values are values that cause said plurality of predetermined frequencies of said periodic pulse signal to change over a range on the order of ten percent.

6. Apparatus as set forth in claim 4, wherein said microcontroller includes a further module for loading said register with a sequence of digital values associated with the predetermined frequencies, one after another at the regular interval, said digital values in said sequence differing from one another in a pseudo-random manner.

7. Apparatus as set forth in claim 6, wherein said microcontroller further includes a memory, wherein said sequence of digital values are stored in said memory, and wherein said further module is a direct memory access module programmed to load values from said memory to said digital register at the regular interval.

8. Apparatus as set forth in claim 7, wherein said direct memory access module is initiated by said central processing unit and thereafter functions autonomously of said central processing unit.

9. Apparatus as set forth in claim 7, wherein said microcontroller further includes an interrupt timer for triggering said direct memory access module at said regular intervals, and wherein said direct memory access module responds to each said trigger by loading the next sequential value from said memory to said digital register.

10. Apparatus as set forth in claim 2, wherein said digital oscillator comprises a digital phase locked loop.

11. Apparatus as set forth in claim 1, wherein said microcontroller includes a digital oscillator controlled by at least one register, a memory for storing values that may be loaded into said at least one register, a timer, and a direct memory access module that may be triggered by said timer and may when triggered load values from said memory into said at least one register, and further wherein said microcontroller includes a central processing unit that initiates said timer and said direct memory access module to load new values into said at least one register at the regular interval without further intervention of said central processing unit.

12. Apparatus as set forth in claim 11, wherein said memory stores therein a sequence of values for loading into said at least one register, said sequence of values varying from one another in a pseudo-random manner so that, when said values are loaded sequentially into said at least one register, said digital oscillator provides a periodic pulse signal that is a pseudo-random spread spectrum oscillator signal.

13. Apparatus for use in a system, comprising;
a microcontroller for controlling the system, said microcontroller including a central processing unit, a memory for storing digital values, a digital oscillator having a register and responsive to said register for generating a periodic pulse signal having a frequency related to the digital value contained in said register, a first module operable to load values from said memory into said register, and a timer for triggering said first module at regular intervals to load a new value from said memory into said register, said values being selected so that said periodic pulse signal generated by said digital oscillator varies in a pseudo-random manner; and,
a switching mode power supply responsive to said periodic pulse signal, said switching mode power supply comprising a solid state switch and a modulator for driving said solid state switch with a drive signal related to said periodic pulse signal generated by said digital oscillator of said microcontroller.

14. Apparatus as set forth in claim 13, wherein said central processing unit initiates the operation of said timer and said first module, said timer and said first module thereafter operating autonomously of said central processing unit.

15. Apparatus as set forth in claim 13, wherein said first module is a direct memory access module.

16. Apparatus as set forth in claim 13, wherein said digital oscillator is a digital phase locked loop.

17. Apparatus as set forth in claim 13, wherein said regular interval is selected to be on the order of fifty microseconds, and wherein said values stored in memory are selected so as to cause said periodic pulse signal to vary in a pseudo-random manner over a frequency range that is on the order of ten percent of the frequency of said periodic pulse signal.

18. A vision system for a motor vehicle, comprising:
an imaging sensor adapted for mounting on a motor vehicle so as to view a scene relative to said motor vehicle, said imaging sensor generating pixel data regarding said image;
at least one processor for processing said pixel data generated from said imaging sensor and controlling said system, said at least one processor including at least one internal module capable of generating a periodic pulse signal, said at least one processor being programmed and operated so that said at least one internal module generates a periodic pulse signal that is a pseudo-random spread spectrum oscillator signal; and
a low noise switching mode power supply, said switching mode power supply comprising a solid state switch, a modulator for driving said solid state switch in accordance with said periodic pulse drive signal generated by said at least one internal module, and an output filter at the output of said solid state switch for generating power for at least a portion of said system.

19. A vision system as set forth in claim 18, wherein said at least one processor comprises at least two processors, wherein one of said processors is an image processor that processes said pixel data generated from said imaging sensor and another of said processors is a system control processor for controlling said system, and wherein said at least one internal module is part of said system control processor.

* * * * *